US008792432B2

(12) United States Patent
Martin et al.

(10) Patent No.: US 8,792,432 B2
(45) Date of Patent: Jul. 29, 2014

(54) PRIORITIZING RACH MESSAGE CONTENTS

(75) Inventors: Brian Martin, Farnham (GB); Keiichi Kubota, Weybridge (GB)

(73) Assignee: Broadcom Corporation, Irvine, CA (US)

(*) Notice: Subject to any disclaimer, the term of this patent is extended or adjusted under 35 U.S.C. 154(b) by 435 days.

(21) Appl. No.: 13/026,512

(22) Filed: Feb. 14, 2011

(65) Prior Publication Data
US 2012/0207102 A1 Aug. 16, 2012

(51) Int. Cl.
H04W 4/00 (2009.01)
(52) U.S. Cl.
USPC ........................................ 370/329; 370/331
(58) Field of Classification Search
USPC .......... 370/329, 331; 455/436, 437, 438, 442, 455/443, 444
See application file for complete search history.

(56) References Cited

U.S. PATENT DOCUMENTS

| 6,487,420 | B1* | 11/2002 | Jonsson | 455/522 |
| 6,845,238 | B1* | 1/2005 | Muller | 455/436 |
| 6,847,420 | B2* | 1/2005 | Lazarev et al. | 349/96 |
| 2004/0228313 | A1* | 11/2004 | Cheng et al. | 370/342 |
| 2008/0045213 | A1* | 2/2008 | Norris et al. | 455/435.1 |

FOREIGN PATENT DOCUMENTS

| EP | 1 720 373 A1 | 11/2006 |
| EP | 1720373 A1 * | 11/2006 |

OTHER PUBLICATIONS

3GPP TSG RAN WG2 Meeting #71, R2-104524, Madrid, Spain, Aug. 23-27, 2010, Nokia Corporation, "Addition of Optimised RACH Message Types", (16 pages).
3GPP TSG-RAN WG2 Meeting #71 bis, R2-105713, Xian, China, Oct. 11-15, 2010, Nokia Corporation, Nokia Siemens Networks, "Analysis on RACH Signalling", (6 pages).
3GPP TSG-RAN WG2 Meeting #72 bis, R2-110304, Dublin, Ireland, Jan. 17-21, 2011, Renesas Electronics Europe, "RACH Signalling Optimisation Considerations", (4 pages).
"Addition of optimised RACH message types", Nokia Corporation, 3GPP TSG-RAN WG2 Meeting #71, R2-104524, Aug. 2010, 15 pgs.
"Analysis on RACH signalling", Nokia Corporation, 3GPP TSG-RAN WG2 Meeting #71bis, R2-105713, Oct. 2010, 5 pgs.
"$3^{rd}$ Generation Partnership Project; Technical Specification Group Radio Access Network' Radio Resource Control (RRC); Protocol specification (Release 10)", 3GPP TS 25.331 V10.2.0, Dec. 2010, 42 pgs.

* cited by examiner

*Primary Examiner* — Andrew Lai
*Assistant Examiner* — Sumitra Ganguly
(74) *Attorney, Agent, or Firm* — Stanton IP Law

(57) ABSTRACT

A network/base station broadcasts an indication to direct a user equipment how to prioritize information for inclusion in an uplink message to be sent on a random access channel RACH. By example one value of the indication directs a user equipment UE to prioritize inter-frequency over intra-frequency neighbor cell measurements for inclusion in the uplink message; and another value (or absence) of the indication directs a UE to prioritize intra-frequency over inter-frequency neighbor cell measurements for inclusion in the uplink message. A UE receiving the broadcast indication constructs the uplink message which includes information that is prioritized in accordance with the indication so as not to exceed a maximum message size. There are also embodiments with second and/or further/third indications in the broadcast system information for more efficiently utilizing the available space in the RACH message, which by example is an RRC Connection Request message in which UE capability information may be prioritized higher or lower than the measurement information.

14 Claims, 4 Drawing Sheets

PRIORITIZING RACH MESSAGE CONTENTS

TECHNICAL FIELD

The exemplary and non-limiting embodiments of this invention relate generally to wireless communication systems, methods, devices and computer programs, and more specifically relate to efficient utilization of uplink RACH messages and signaling for implementing such efficiency.

BACKGROUND

The following abbreviations that may be found in the specification and/or the drawing figures are defined as follows:
- 3GPP third generation partnership project
- BCCH broadcast channel
- CCCH common control channel
- DL downlink (node B towards UE)
- IE information element
- MAC medium access control
- Node B base station
- RACH random access channel
- RRC radio resource control
- UE user equipment
- UL uplink (UE towards node B)
- UTRA universal terrestrial radio access
- UTRAN universal terrestrial radio access network
- UMTS universal mobile telecommunications system
- WCDMA wideband code division multiple access Various radio technologies utilize various RACH procedures for a UE to gain contention-based access to a network. The RACH is one of multiple CCCHs, and in the UTRAN system the RACH procedure includes the UE sending an access message which includes a preamble part and a message part. The UE seeking connection to a WCDMA base station first transmits a preamble (signature sequence) on a RACH and then listens on an acquisition indicator channel AICH for a acquisition indicator AI corresponding to that preamble. If that AI is not received, the UE tries again and continues the process until it receives a corresponding AI. At that point the UE can then transmit the message part of its access message, which is also sent UL on the RACH. This message part is termed a RRC Connection Request in UTRAN.

Being on the RACH, the transport block size of the UE's RRC Connection Request message is tightly limited. Several 3GPP releases have added extensions to this message and it is now near if not at its size limit. Specifically, the maximum size of UL CCCH messages is 166 bits: the RACH transport block size (168 bits) less the size of the MAC header (2 bits). A more detailed analysis of this bit-size may be seen at document R2-105713 entitled "ANALYSIS ON RACH SIGNALLING" (3GPP TSG-RAN WG2 Meeting #71bis; Xian, China; 11-15 Oct. 2010; by Nokia Corporation and Nokia Siemens Networks), which sets forth that there are currently occasions in which the 166 bit size is too limiting.

One type of information which the UE reports on the RACH in its RRC Connection Request message is neighbor cell measurements. Consider FIG. 1: the UE sends its RRC Connection Message UL to base station A on that station's RACH, but this UE is near the border of two other cells controlled by respective base stations B and C. Base station A would like to have the UE's neighbor cell measurements from those other cells so it can make timely and proper decisions for handing over the UE. While the UE also sends neighbor cell measurements at other times and on other channels once the UE is in a RRC-Connected state for routine mobility, base station A would like to have those measurements as soon as the UE attempts access on the RACH so base station A can re-direct the UE's RRC connection to another neighbor base station if that neighbor is more appropriate for the requesting UE.

UEs which support features from 3GPP Release 7 and onwards support neighbor cell measurements for both inter-frequency and intra-frequency neighbors of the RACH base station. For such a UE the network/base station A would require the UE to send measured results on the RACH for both those types of neighbors, but this would exceed the RACH message size limit To resolve this issue, current 3GPP specifications require the UE to check the message size, and if exceeded the UE shall omit RACH measured results starting with inter-frequency results. Specifically, subclause 8.5.23 of 3GPP TS 25.331 V10.0.0 states (emphasis added):

1> for messages transmitted on CCCH, take care that the maximum allowed message size is not exceeded when forming the IE "Measured results on RACH", i.e. limit the number of included neighbour cells or if required omit the IE "Measured results on RACH" altogether. When limiting the number of included neighbouring cells, the number of inter-frequency cells should be limited first i.e. inter-frequency cells should be omitted before limiting the number of intra-frequency cells.

In relevant teachings, document R2-104524 which is a Change Request for TR 25.331 V10.0.0 entitled "ADDITION OF OPTIMISED RACH MESSAGE TYPES" (3GPP TSG-RAN WG2 Meeting #71; Madrid, Spain; 23-27 Aug. 2010; by Nokia Corporation and Nokia Siemens Networks) introduce a new RACH message type which removes the non-critical extension indicators in abstract syntax notation asn1. But the message space saved with this new RACH message type is not enough to allow the UE to include neighbor cell measurements for both inter-frequency and intra-frequency neighbors in its UL RACH message.

The inventors consider the current approach in 3GPP as static approach and overly limiting, whereas the new RACH message noted above is not a solution either. The exemplary embodiments presented below resolve the above problems to a much greater extent than either the current 3GPP solution or the new RACH message type.

SUMMARY

In a first exemplary embodiment of the invention there is an apparatus comprising at least one processor and at least one memory storing a computer program. In this embodiment the at least one memory with the computer program is configured with the at least one processor to cause the apparatus to at least broadcast an indication for directing a user equipment how to prioritize information for inclusion in an uplink message to be sent on a random access channel.

In a second exemplary embodiment of the invention there is a method comprising: in a first instance, broadcasting an indication having a first value which directs a user equipment to prioritize inter-frequency neighbor cell measurements over intra-frequency neighbor cell measurements for inclusion in an uplink message to be sent on a random access channel; and in a second instance, directing a user equipment to prioritize intra-frequency neighbor cell measurements over inter-frequency neighbor cell measurements for inclusion in an uplink message to be sent on the random access channel by broadcasting a second value of the indication or by not broadcasting the indication.

In a third exemplary embodiment of the invention there is a computer readable memory storing a computer program comprising code for broadcasting an indication to direct a user equipment how to prioritize information for inclusion in an uplink message to be sent on a random access channel.

In a fourth exemplary embodiment of the invention there is an apparatus comprising at least one processor and at least one memory storing a computer program. In this embodiment the at least one memory with the computer program is configured with the at least one processor to cause the apparatus to at least: receive a broadcast indication for prioritizing information for inclusion in an uplink message to be sent on a random access channel; and construct the uplink message which includes information that is prioritized in accordance with the broadcast indication so as not to exceed a maximum message size.

In a fifth exemplary embodiment of the invention there is a method comprising: receiving a broadcast indication for prioritizing information for inclusion in an uplink message to be sent on a random access channel; and constructing the uplink message which includes information that is prioritized in accordance with the broadcast indication so as not to exceed a maximum message size.

In a sixth exemplary embodiment of the invention there is a computer readable memory storing a computer program comprising: code for receiving a broadcast indication for prioritizing information for inclusion in an uplink message to be sent on a random access channel; and code for constructing the uplink message which includes information that is prioritized in accordance with the broadcast indication so as not to exceed a maximum message size.

These and other embodiments and aspects are detailed below with particularity.

DETAILED DESCRIPTION

Figure 1:
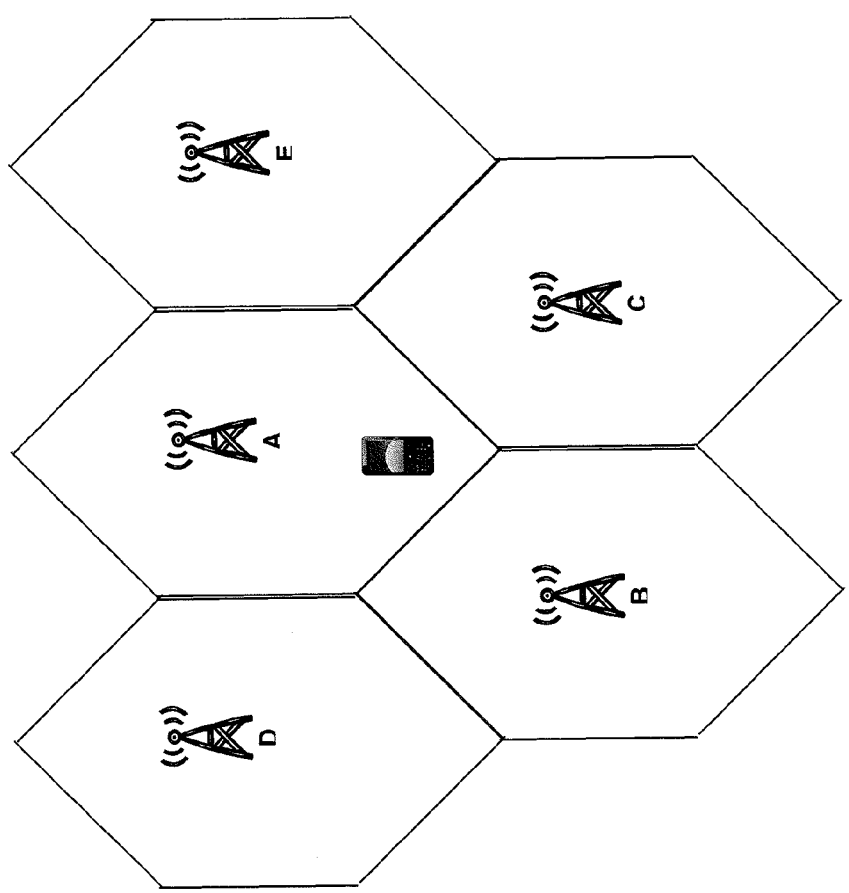
FIG. 1 is a schematic drawing of neighboring wireless network cells with a user equipment within one cell for illustrating an exemplary environment in which embodiments of the invention may be practiced to advantage.

Assume for example that base station B of FIG. 1 is an inter-frequency neighbor of base station A, and base station C is an intra-frequency neighbor of base station A. The UE takes measurements of both but there is insufficient headroom in the RRC Connection Request message to include both measurement results. If the UE followed the current 3GPP directive noted in the background section above it would always send only the measurement results for base station C which is an intra-frequency neighbor cell and omit the inter-frequency neighbor cell measurement results for base station B.

Generally, a base station/cell is considered intra-frequency with respect to base station/cell A when it uses a same radio frequency for UE connections as does base station/cell A, and is inter-frequency with respect to base station/cell A when it uses a different radio frequency for UE connections as does base station/cell A.

Some networks use the inter-frequency measurement results to determine whether the RRC connection can be redirected to another frequency (for example, for load balancing, or for a particular service). If the UE omits these results as is always the case under current 3GPP specifications whenever the CCH message size is limiting to what the UE can report, then the network can no longer use this information to determine whether re-direction is possible. This will impact certain network load-balancing algorithms and potentially impact the reliability of re-direction. But the more common case in practice is for the base station to use the inter-frequency measurement results for re-directing the UE to another frequency. Using intra-frequency measurement results for a soft handover in a UE connection setup is not very common in practice.

Exemplary embodiments of this invention give the network (e.g., base station A) the option of having the UE report the inter-frequency measurement results and omit the intra-frequency measurement results where the CCCH message size will not admit them both. In an exemplary embodiment the network exercises this option by indicting in signaling how to perform prioritization of RACH measurement results which are to be included or omitted if the transport block size is insufficient to include all measurement results.

In one exemplary embodiment, the network utilizes inter-frequency measurement results and so the network indicates that inter-frequency measurement results have priority over intra-frequency measurement results. In this embodiment the network makes this indication in the system information which it broadcasts. For this case, the UE in response to reading that indication in the system information shall first omit intra-frequency measurement results in order that the message size is not exceeded. By example, this indication can be implemented as only a single bit in system information. If the bit has one value the UE shall first omit intra-frequency measurement results, and if the bit has an opposite value or is not broadcast at all then the UE shall first omit inter-frequency measurement results as is the current but inflexible practice in 3GPP specifications.

The above embodiment may be implemented by adoption into a wireless specification. By example, such a specification might incorporate the following exemplary but non-limiting language which is adapted from that in the background section to reflect this aspect of the invention:

1> for messages transmitted on CCCH, take care that the maximum allowed message size is not exceeded when forming the IE "Measured results on RACH", i.e. limit the number of included neighbour cells or if required omit the IE "Measured results on RACH" altogether. When limiting the number of included neighbouring cells:
2> If the IE "prioritise inter-frequency RACK measurement results" is present and set to "TRUE"
3> the number of intra frequency cells should be limited first i.e. intra frequency cells should be omitted before limiting the number of inter-frequency cells.
2> Otherwise:
3> the number of inter-frequency cells should be limited first i.e. inter-frequency cells should be omitted before limiting the number of intra-frequency cells.

In another embodiment, the above flexible priority is used in conjunction with the new RACH message type detailed at document R2-104524 (referenced in the background section above). This makes it less likely that the measurement results will exceed the upwardly-limited size of the RACH message. But if some measurement results still must be omitted, then by omitting the intra-frequency results in accordance with the indicator in the system information still allows the network to perform re-redirection based on the inter-frequency measurements which the UE does include in its UL RACH message. If the above measurement result prioritization indication is considered a first indication, then the network may also broadcast a second indication to indicate whether or not it supports the new RACH message type. By example, the first and second indications can be implemented as two bits in system information: one bit as the first indication to indicate how to prioritize the inter-frequency/intra-frequency measurement results, and another bit as the second indication to indicate whether the network supports the new RACH message format.

In a further exemplary embodiment which may be utilized with or without the new RACH message type, the network sends a third indication which indicates whether to prioritize particular RACH measurement results over particular UE capabilities for inclusion in the UL RACH message. Since this third indication may be used in various embodiments with or without the above-detailed second indication, this third indication is alternatively referred to herein as a further indication. For example, the network may use this third or further indication to indicate that the network supports features only from Release 8 and earlier. The UE which is compatible with Release 9 or Release 10 does not need to indicate in its RACH message whether it can support features which are specific to Release 9 or 10, since the network cannot utilize those features anyway. From this third or further indication the UE knows to prioritize measurement results over Release 9/10 features for inclusion in the UL RACH message. Additional bits beyond the first indication (and second indication of there are different RACH message types in use) are added to system information for this third or further indication; for example an enumerated type could be used to indicate which release the network supports, and hence from what release the UE can omit capabilities from its RACH message.

Figure 2:
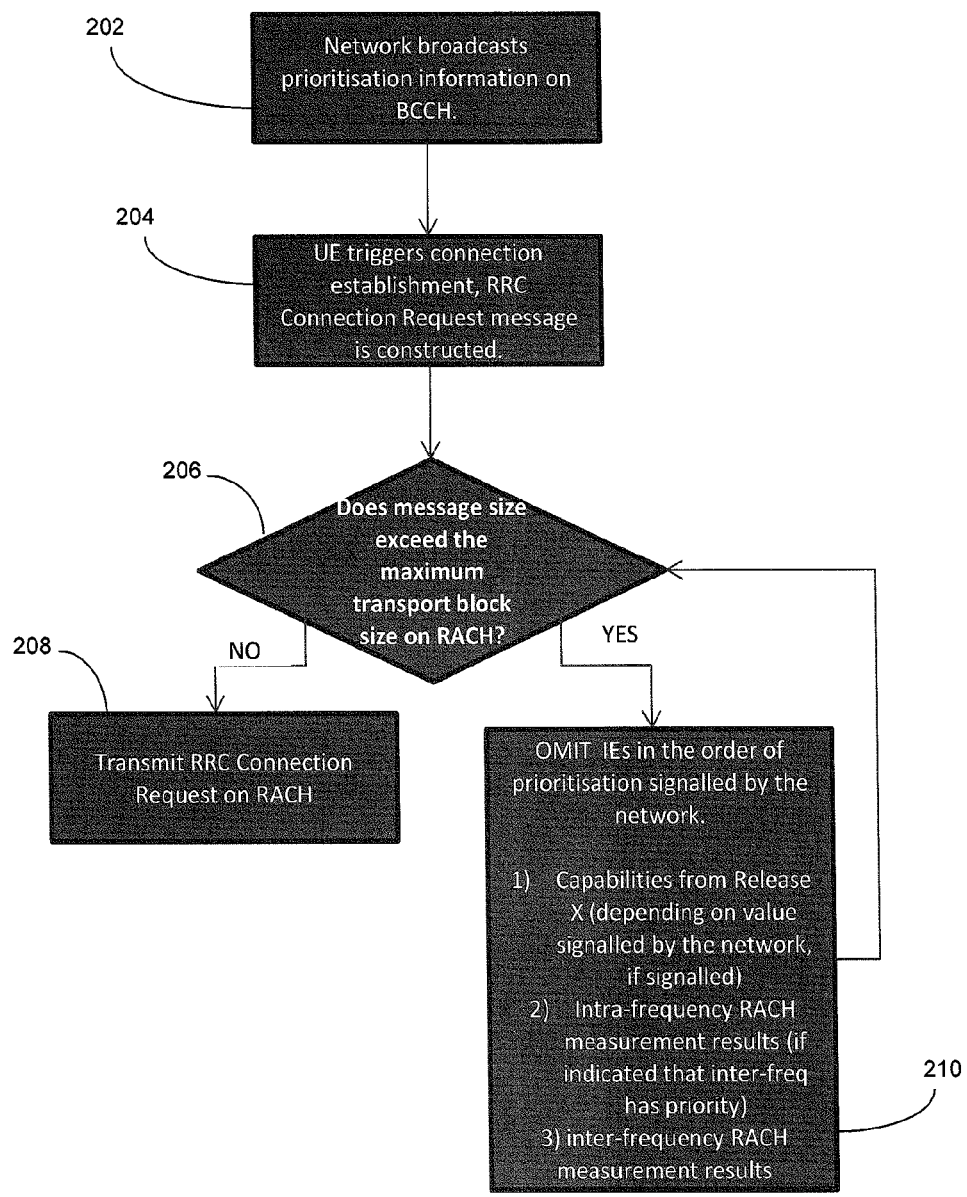
FIG. 2 is a process flow diagram illustrating discrete steps and decisions according to an exemplary embodiment of the invention.

FIG. 2 illustrates an overview of the above process. At block 202 the network broadcasts on its BCCH prioritization information (indication) for prioritizing measurement results for inclusion in UL CCCH/RACH messages. At block 204 the UE, after having listened to the BCCH, triggers connection establishment and constructs a RRC Connection Request message. At block 206 the UE checks the size of that message, which is not yet sent, against the maximum transport block size allowed on the CCCH/RACH. If the message size checked at block 206 does not exceed the maximum, then block 208 applies and the UE transmits the RRC Connection Request message which it constructed at block 204. If the message size checked at block 206 does exceed the maximum, then block 210 applies and the UE omits information elements IEs in the order of prioritization signaled by the network at block 202.

By example, block 210 operates as follows. If the network sent a third or further indication as detailed above the UE selectively drops from the block 204-constructed message any of its own capabilities included in that message which are beyond the network's own capabilities as indicated in that third/further indication. The UE re-checks the message size at block 206, and if it still exceeds the maximum then block 210 is re-entered. From the first indication as detailed above which was broadcast at block 202, the UE selectively drops from what remains of the block 204-constructed message the intra-frequency measurement results or the inter-frequency measurement results, whichever is indicated by that first indication as having the lesser priority.

Figure 3:
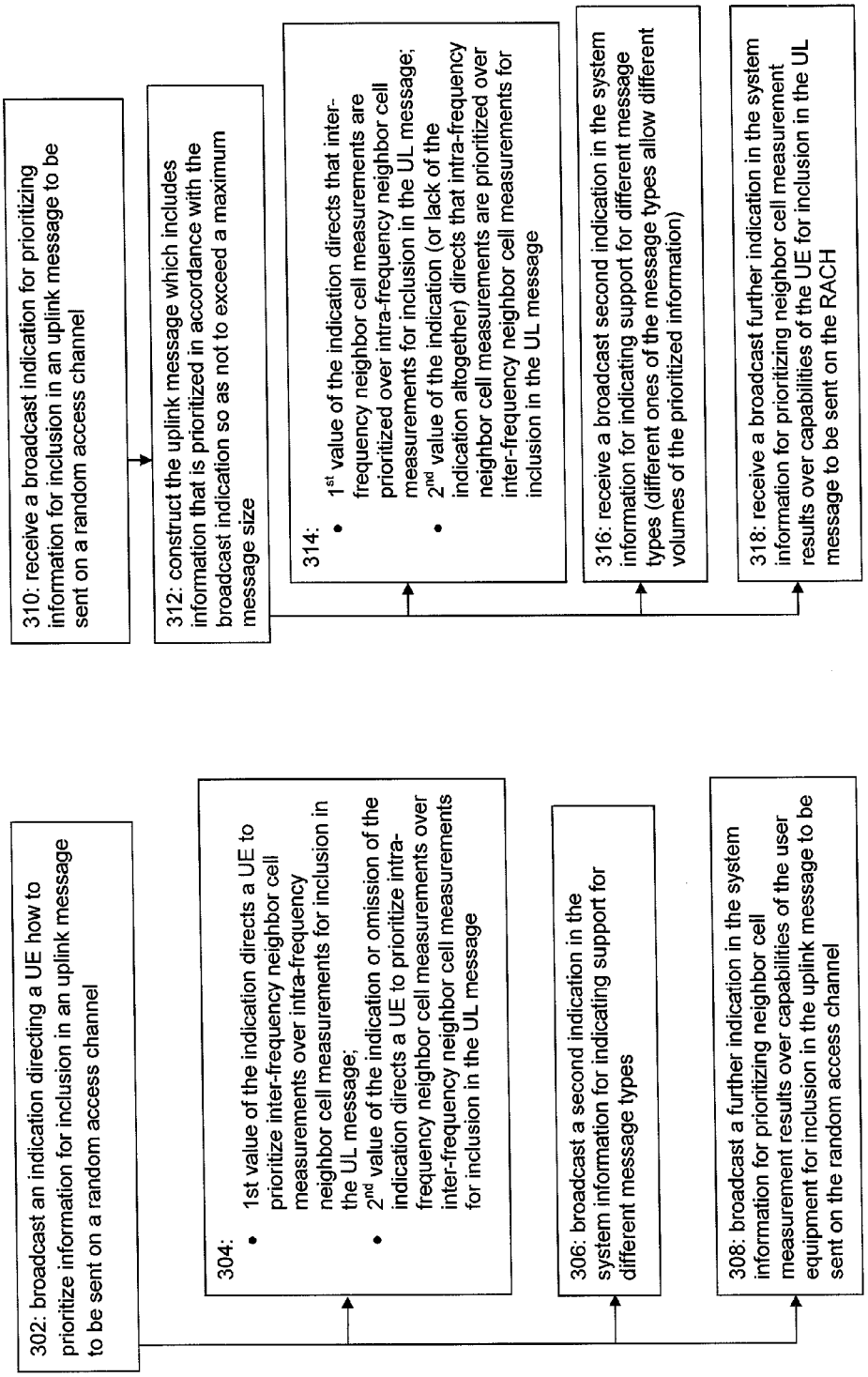
FIGS. 3A-B are logic flow diagrams illustrating from the respective perspectives of a network access node and a user equipment the operation of a method, and a result of execution of computer program instructions embodied on a computer readable memory, in accordance with the exemplary embodiments of this invention.

FIGS. 3A-B are logic flow diagrams which describe these exemplary embodiments of the invention from the perspective of the access node/base station and the UE, respectively. FIGS. 3A-B may each be considered to illustrate the operation of a method, and a result of execution of a program of computer instructions stored in a computer readable memory, and a specific manner in which components of an electronic device are configured to cause that electronic device to operate. The various blocks shown in FIGS. 3A-B may also be considered as a plurality of coupled logic circuit elements constructed to carry out the associated function(s), or specific result of strings of computer program code stored in a memory.

From the perspective of the base station, in FIG. 3A there is broadcast at block 302 an indication to direct a user equipment how to prioritize information for inclusion in an uplink message to be sent on a random access channel. Further elements of FIG. 3A are optional and go to the specific exemplary embodiments variously detailed above.

Block 304 specifies that a first value of the indication directs a UE to prioritize inter-frequency neighbor cell measurements over intra-frequency neighbor cell measurements for inclusion in the uplink message; and a second value of the indication or outright omission of the indication from being broadcast directs a UE to prioritize intra-frequency neighbor cell measurements over inter-frequency neighbor cell measurements for inclusion in the uplink message. Blocks 302 and 304 may be combined from the base station's perspective to broadcast in a first instance the indication having the first value and in a second instance broadcasting the indication having the second value or not broadcasting the indication at all, since the network/base station can change the value of that indication (or refrain from broadcasting it) as the network deems appropriate.

At block 306, if we consider the indication at block 302/304 as a first indication then the base station broadcasts a second indication in the system information for indicating that the base station supports different message types.

And at block 308, which may be combined with block 306 but not necessarily, the base station broadcasts a third or further indication in the system information for prioritizing neighbor cell measurement results over capabilities of the user equipment for inclusion in the uplink message to be sent on the random access channel.

From the perspective of the UE, in FIG. 3B there is received at block 310 a broadcast indication for prioritizing information for inclusion in an uplink message to be sent on a random access channel. At block 312 the UE constructs the uplink message which includes information that is prioritized in accordance with the broadcast indication so as not to exceed a maximum message size. Further elements of FIG. 3B are optional and go to the specific exemplary embodiments variously detailed above.

Block 314 specifies that a first value of the indication directs that inter-frequency neighbor cell measurements are prioritized over intra-frequency neighbor cell measurements for inclusion in the uplink message; and a second value of the indication or omission of the indication altogether directs that intra-frequency neighbor cell measurements are prioritized over inter-frequency neighbor cell measurements for inclusion in the uplink message.

If we consider the indication received at block 310 as a first indication then the UE receives at block 316 a broadcast second indication in the system information for indicating that the access node supports different message types, in which different ones of the message types allow different volumes of the prioritized information.

And at block 318, which may be combined with block 316 but not necessarily, the UE receives a broadcast third or further indication in the system information for prioritizing neighbor cell measurement results over capabilities of the UE for inclusion in the uplink message to be sent on the RACH. In this case the constructing of block 312 means that the UE constructs the uplink message to include information that is prioritized in accordance with the broadcast first and third/further indications so as not to exceed the maximum message size.

The blocks of FIGS. 3A-B and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

One technical effect and advantage of these exemplary embodiments is that the UE is enabled to prioritize the content of the RRC Connection Request message more efficiently, an effect which is enhanced even further by the second and/or third indications detailed above. The solutions presented herein also avoids features in the network being redundant, or unusable or unreliable, and also provides a general framework for extending the RRC Connection Request to remain a viable message for future releases of UTRAN and E-UTRAN.

Figure 4:
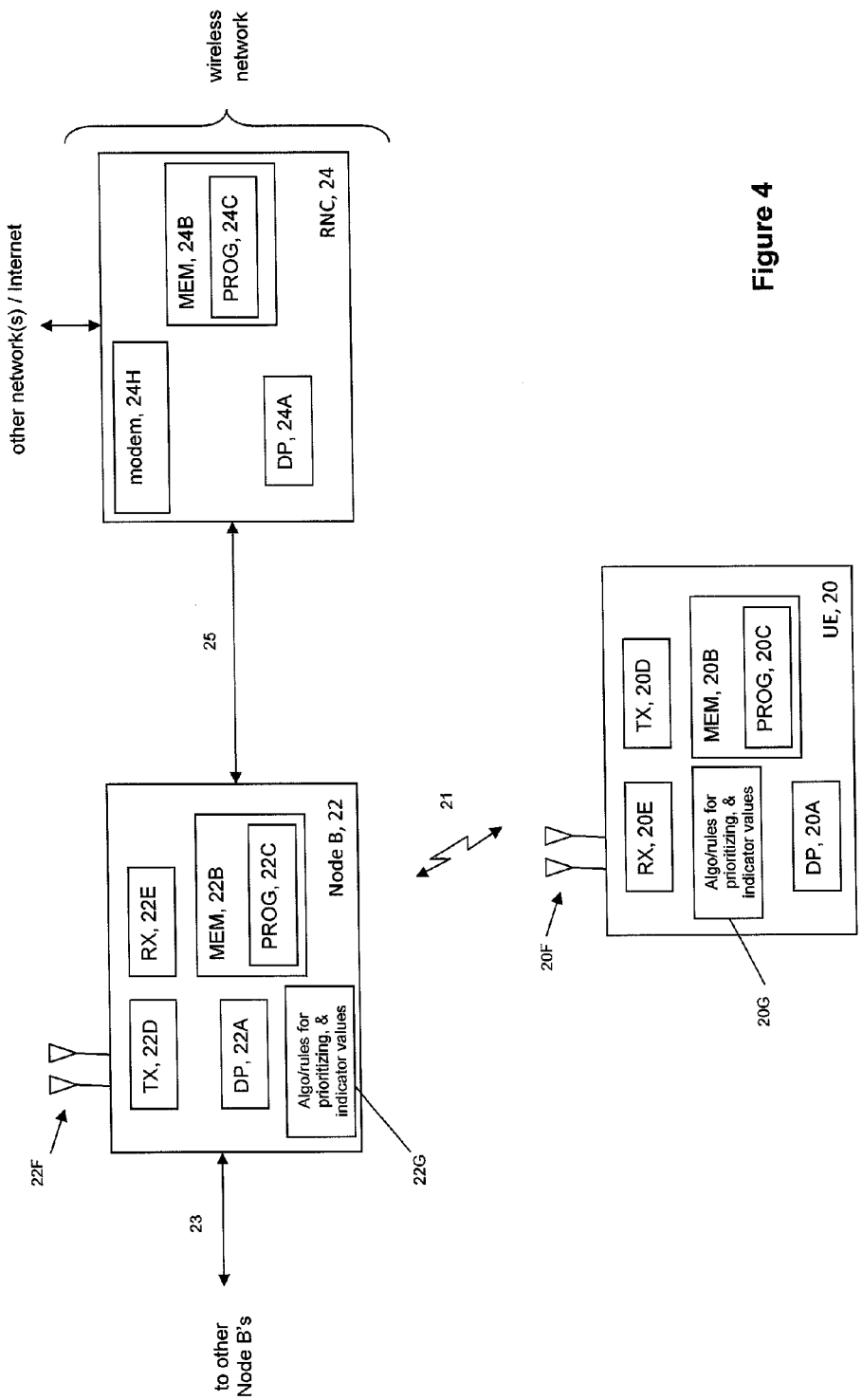
FIG. 4 is a simplified block diagram of a UE in communication with a wireless network including a radio network controller RNC and a Node B, and illustrates exemplary electronic devices suitable for use in practicing exemplary embodiments of this invention.

Reference is now made to FIG. 4 for illustrating a simplified block diagram of various electronic devices and apparatus that are suitable for use in practicing the exemplary embodiments of this invention. In FIG. 4 a wireless network (node B 22 and RNC 24) is adapted for communication over a wireless link 21 with an apparatus, such as a mobile terminal or UE 20, via a network access node, such as a base or relay station or more specifically a node B 22. The network may include a node (e.g., the RNC 24) which provides connectivity with further networks (e.g., a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the node B 22 via one or more antennas 20F. Also stored in the MEM 20B is an algorithm or a set of rules 20G for prioritizing RRC Connection Request messages according to values of indicators received on broadcast channels.

The node B 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. There is a data and/or control path 25 coupling the node B 22 with the RNC 24, and another data and/or control path 23 coupling the node B 22 to other node B's/access nodes. Also stored in the MEM 22B of the node B 22 is an algorithm or a set of rules 22G for prioritizing RRC Connection Request messages according to values of indicators received on broadcast channels, so the node B 22 knows what values to set for the indicators it broadcasts.

The RNC 24 includes processing means such as at least one data processor (DP) 24A, storing means such as at least one computer-readable memory (MEM) 24B storing at least one computer program (PROG) 24C, and communicating means such as a modem 24H for bidirectional wireless communications with the Node B 22 via the data/control path 25. While not particularly illustrated for the UE 20 or node B 22, those devices are also assumed to include as part of their wireless communicating means a modem which may be inbuilt on an RF front end chip within those devices 20, 22 and which also carries the TX 20D/22D and the RX 20E/22E.

At least one of the PROGs 20C in the UE 20 is assumed to include program instructions that, when executed by the associated DP 20A, enable the device to operate in accordance with the exemplary embodiments of this invention, as detailed above. The UE 20 and the node B 22 may also have software to implement certain aspects of these teachings for implementing the indications/indicators which are broadcast DL. In these regards the exemplary embodiments of this invention may be implemented at least in part by computer software stored on the MEM 20B, 22B which is executable by the DP 20A of the UE 20 and/or by the DP 22A of the node B 22, or by hardware, or by a combination of tangibly stored software and hardware (and tangibly stored firmware). Electronic devices implementing these aspects of the invention need not be the entire UE 20 or node B 22, but exemplary embodiments may be implemented by one or more components of same such as the above described tangibly stored software, hardware, firmware and DP, or a system on a chip SOC or an application specific integrated circuit ASIC.

In general, the various embodiments of the UE 20 can include, but are not limited to personal portable digital devices having wireless communication capabilities, including but not limited to cellular telephones, navigation devices, laptop/palmtop/tablet computers, digital cameras and music devices, and Internet appliances. Exemplary embodiments of these teachings may be embodied within such a UE, or one or more components thereof, any of which is generally termed herein as an apparatus. Other exemplary embodiments of these teachings may be embodied within the node B or more generally a wireless access node, or one or more components thereof, any of which is also generally termed herein as an apparatus.

Various embodiments of the computer readable MEMs 20B, 22B and 24B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A and 24A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the UTRAN system, it should be appreciated that the exemplary embodiments of this invention are not limited for use with only this one particular type of wireless communication system, and that they may be used to advantage in other wireless communication systems such as for example E-UTRAN, GERAN and others which utilize a RACH access procedure.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus, comprising:
   at least one processor; and
   at least one memory storing a computer program;
   wherein the at least one memory storing the computer program is configured with the at least one processor to cause the apparatus to at least:
      broadcast an indication to direct a user equipment whether to prioritize inter-frequency or intra-frequency neighbor cell measurements for inclusion in an uplink connection request message to be sent on a random access channel;
      in which one value of the indication directs the user equipment to prioritize the inter-frequency neighbor cell measurements over the intra-frequency neighbor cell measurements for inclusion in the uplink connection request message; and the at least one memory storing the computer program is configured with the at least one processor to cause the apparatus to direct the user equipment to prioritize the intra-frequency neighbor cell measurements over the inter-frequency neighbor cell measurements for inclusion in the uplink connection request message by broadcasting the indication having a different value or by not broadcasting the indication, and
      in which the indication is within an information element of system information sent on a broadcast channel from an access node of a UTRAN or an E-UTRAN wireless system, and the uplink connection request message is a Radio Resource Control Connection Request message.

2. The apparatus according to claim 1, in which the size of the uplink connection request message is upwardly limited, and the one value of the indication directs the user equipment to exclude from the uplink connection request message the intra-frequency neighbor cell measurement results as necessary so as not to exceed the upward limit.

3. The apparatus according to claim 1, in which the indication is a first indication and the at least one memory storing the computer program is configured with the at least one processor to cause the apparatus further to at least:
   broadcast a second indication in the information element of the system information for indicating that the apparatus supports different message types.

4. The apparatus according to claim 1, in which the indication is a first indication and the at least one memory storing the computer program is configured with the at least one processor to cause the apparatus further to at least:
   broadcast a further indication in the information element of the system information indicating whether to prioritize the neighbor cell measurements over capabilities of the user equipment for inclusion in the uplink Radio Resource Control Connection Request message to be sent on the random access channel.

5. A method comprising:
   a network access node directing one user equipment to prioritize inter-frequency neighbor cell measurements over intra-frequency neighbor cell measurements for inclusion in its uplink connection request message to be sent on a random access channel by broadcasting an indication having one value; and
   the network access node directing another user equipment to prioritize intra-frequency neighbor cell measurements over inter-frequency neighbor cell measurements for inclusion in its uplink connection request message to be sent on the random access channel by broadcasting the indication having a different value or by not broadcasting the indication;
   in which the indication is within an information element of system information sent on a broadcast channel and the method is executed by the network access node which is an access node of a UTRAN or an E-UTRAN wireless system, and each uplink connection request message is a Radio Resource Control Connection Request message.

6. The method according to claim 5, in which the size of each uplink connection request message is upwardly limited, and the one value of the indication directs the one user equipment to exclude from its uplink connection request message the intra-frequency neighbor cell measurements as necessary so as not to exceed the upward limit.

7. The method according to claim 5, in which the indication is a first indication and the method further comprises:
   the network access node further broadcasting a second indication in the information element of the system information for indicating that the network access node supports different message types.

8. The method according to claim 5, in which the indication is a first indication and the method further comprises:
   the network access node additionally broadcasting a further indication in the information element of the system information indicating whether to prioritize the neighbor cell measurements over capabilities of the user equipment for inclusion in the respective user equipment's Radio Resource Control Connection Request message to be sent on the random access channel.

9. An apparatus, comprising:
   at least one processor; and
   at least one memory storing a computer program;
   wherein the at least one memory storing the computer program is configured with the at least one processor to cause the apparatus to at least:
      receive a broadcast indication indicating whether to prioritize inter-frequency or intra-frequency neighbor cell measurements for inclusion in an uplink connection request message to be sent on a random access channel; and
      construct the uplink connection request message which includes the measurements that are prioritized in accordance with the broadcast indication so as not to exceed a maximum size of the uplink connection request message
      in which one value of the indication directs that the inter-frequency neighbor cell measurements are prioritized over the intra-frequency neighbor cell measurements for inclusion in the uplink connection request message; and a different value of the indication or omission of the indication directs that the intra-frequency neighbor cell measurements are prioritized over the inter-frequency neighbor cell measurements for inclusion in the uplink connection request message, and
      in which the indication is within an information element of system information received on a broadcast channel from an access node of a UTRAN or an E-UTRAN wireless system, and the uplink connection request message is a Radio Resource Control Connection Request message.

10. The apparatus according to claim 9, in which the indication is a first indication and the at least one memory storing the computer program is configured with the at least one processor to cause the apparatus further to at least:

receive a broadcast second indication in the information element of the system information for indicating that the access node supports different message types, in which different ones of the message types allow different volumes of the prioritized measurements.

11. The apparatus according to claim 9, in which the indication is a first indication and the at least one memory storing the computer program is configured with the at least one processor to cause the apparatus further to at least:

receive a broadcast further indication in the information element of the system information indicating whether to prioritize the neighbor cell measurements over capabilities of the user equipment for inclusion in the uplink connection request message to be sent on the random access channel; and construct the uplink connection request message which includes information that is prioritized in accordance with the broadcast first and further indications so as not to exceed the maximum size of the uplink connection request message.

12. A method comprising:

receiving, by a user equipment, a broadcast indication indicating whether to prioritize inter-frequency or intra-frequency neighbor cell measurements for inclusion in an uplink connection request message to be sent on a random access channel; and constructing the uplink connection request message which includes measurements that are prioritized in accordance with the broadcast indication so as not to exceed a maximum size of the uplink connection request message;

in which one value of the indication directs that the inter-frequency neighbor cell measurements are prioritized over the intra-frequency neighbor cell measurement results for inclusion in the uplink connection request message; and a different value of the indication or omission of the indication directs that the intra-frequency neighbor cell measurements are prioritized over the inter-frequency neighbor cell measurements for inclusion in the uplink connection request message, and in which the indication is within an information element of system information received on a broadcast channel from an access node of a UTRAN or an E-UTRAN wireless system, and the uplink connection request message is a Radio Resource Control Connection Request message.

13. The method according to claim 12, in which the indication is a first indication and the method further comprises:

receiving, by the user equipment, a broadcast second indication in the information element of the system information for indicating that the access node broadcasting the information element of the system information supports different message types, in which different ones of the message types allow different volumes of the prioritized measurement results.

14. The method according to claim 12, in which the indication is a first indication and the method further comprises:

receiving, by the user equipment, a broadcast further indication in the information element of the system information indicating whether to prioritize the neighbor cell measurements over capabilities of the user equipment for inclusion in the uplink connection request message to be sent on the random access channel; and constructing the uplink connection request message which includes information that is prioritized in accordance with the broadcast first and further indications so as not to exceed the maximum size of the connection request message.

* * * * *